United States Patent
She et al.

(10) Patent No.: US 9,975,573 B2
(45) Date of Patent: May 22, 2018

(54) ENHANCED STEERING OPERATION

(71) Applicant: Ford Global Technologies, LLC, Dearborn, MI (US)

(72) Inventors: Eric She, Troy, MI (US); Nathaniel Abram Rolfes, Detroi, MI (US); William James Bouse, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 123 days.

(21) Appl. No.: 15/223,115

(22) Filed: Jul. 29, 2016

(65) Prior Publication Data

US 2018/0029637 A1     Feb. 1, 2018

(51) Int. Cl.
    *B62D 6/00*            (2006.01)
    *B62D 5/04*            (2006.01)
    (Continued)

(52) U.S. Cl.
    CPC ........... *B62D 6/002* (2013.01); *B62D 5/0463* (2013.01); *B62D 5/0478* (2013.01);
    (Continued)

(58) Field of Classification Search
    CPC ... B62D 5/06; B62D 6/00; B62D 5/30; B62D 3/14; B62D 1/166; B62D 5/04; B62D 5/008; B62D 3/00; B62D 6/002; B62D 5/0463; B62D 5/0481; B62D 5/0478; B62D 5/006; B62D 5/003; B62D 5/065;
    (Continued)

(56) References Cited

U.S. PATENT DOCUMENTS 5,253,730 A * 10/1993 Hayashi .................. B62D 5/06
                                                                 180/417
5,273,129 A * 12/1993 Wright .................... B62D 5/30
                                                                 180/407

(Continued)

FOREIGN PATENT DOCUMENTS

| DE | 19947265 A1 | 1/1999 |
| DE | 102006053294 A1 | 5/2008 |
| DE | 102014107914 A1 | 12/2015 |

OTHER PUBLICATIONS

UKIPO Search Report for Application No. GB1712158.3 dated Dec. 1, 2017 (4 pages).

*Primary Examiner* — Behrang Badii
(74) *Attorney, Agent, or Firm* — Frank A MacKenzie; Bejin Bieneman PLC

(57) ABSTRACT

An operation mode of a first actuator engaged with a steering rack is determined. An operation mode of a second actuator engaged with a steering column is determined. The operation mode of one of the first and second actuators is adjusted upon detecting a failure in the other of the first and second actuators. At least one of the steering rack and the steering column is actuated based on the operation mode. In an angle control mode, a predetermined steering angle is provided to the first and second actuators to adjust the steering rack according to the steering angle. In a torque control mode, a steering column torque from a torsion sensor disposed on the steering column is provided to the first and second actuators to adjust the steering rack according to the steering column torque.

20 Claims, 4 Drawing Sheets

(51) Int. Cl.
    *B62D 1/16*     (2006.01)
    *B62D 3/02*     (2006.01)
    *B62D 3/14*     (2006.01)
    *B62D 5/30*     (2006.01)
    *B62D 5/00*     (2006.01)
    *B62D 5/06*     (2006.01)
    *B62D 3/00*     (2006.01)

(52) U.S. Cl.
    CPC ............ B62D 5/0481 (2013.01); *B62D 1/166* (2013.01); *B62D 3/00* (2013.01); *B62D 3/02* (2013.01); *B62D 3/14* (2013.01); *B62D 5/003* (2013.01); *B62D 5/006* (2013.01); *B62D 5/008* (2013.01); *B62D 5/04* (2013.01); *B62D 5/0472* (2013.01); *B62D 5/06* (2013.01); *B62D 5/30* (2013.01); *B62D 6/00* (2013.01)

(58) Field of Classification Search
    CPC ........ B62D 5/0451; B62D 6/008; B62D 3/02; B62D 5/00; B62D 7/20; B62D 7/00; B62D 6/04; B62D 1/16; F16H 25/22
    See application file for complete search history.

(56) References Cited

U.S. PATENT DOCUMENTS

| | | |
|---|---|---|
| 5,927,430 A | 7/1999 | Mukai et al. |
| 6,343,671 B1* | 2/2002 | Ackermann ........... B62D 1/166 180/443 |
| 6,523,637 B1 | 2/2003 | Nakano et al. |
| 7,144,346 B2 | 12/2006 | Hermann et al. |
| 7,690,475 B2 | 4/2010 | Tsutsumi et al. |
| 8,994,521 B2 | 3/2015 | Gazit |
| 2005/0150712 A1 | 7/2005 | Tokumoto |
| 2005/0257992 A1 | 11/2005 | Shiino et al. |
| 2007/0256885 A1* | 11/2007 | Ammon ................ B62D 5/008 180/417 |
| 2009/0038876 A1* | 2/2009 | Ito .......................... B62D 3/14 180/421 |
| 2009/0216407 A1* | 8/2009 | Cottard ............... B62D 5/0463 701/42 |
| 2013/0131927 A1 | 5/2013 | Ishihara |

\* cited by examiner

ENHANCED STEERING OPERATION

BACKGROUND

A steering assist system in a vehicle typically includes an actuator arranged to engage a steering rack. The actuator provides additional force to move the steering rack, allowing an operator to steer the vehicle with less exertion. That is, the operator rotates a steering wheel and engages the actuator, which provides force to the steering rack in addition to a torque applied to the steering wheel. The actuator includes a microprocessor programmed to operate the actuator to move the steering rack. Present steering assist systems typically rely on a single actuator engaged with a steering rack controlled by at least one microprocessor.

DETAILED DESCRIPTION

A steering assist system including a second actuator engaged with a steering column allows the steering assist system to operate when one of the actuators fails. That is, the steering assist system includes two redundant actuators that are separately operable and arranged to assist steering.

Figure 1:
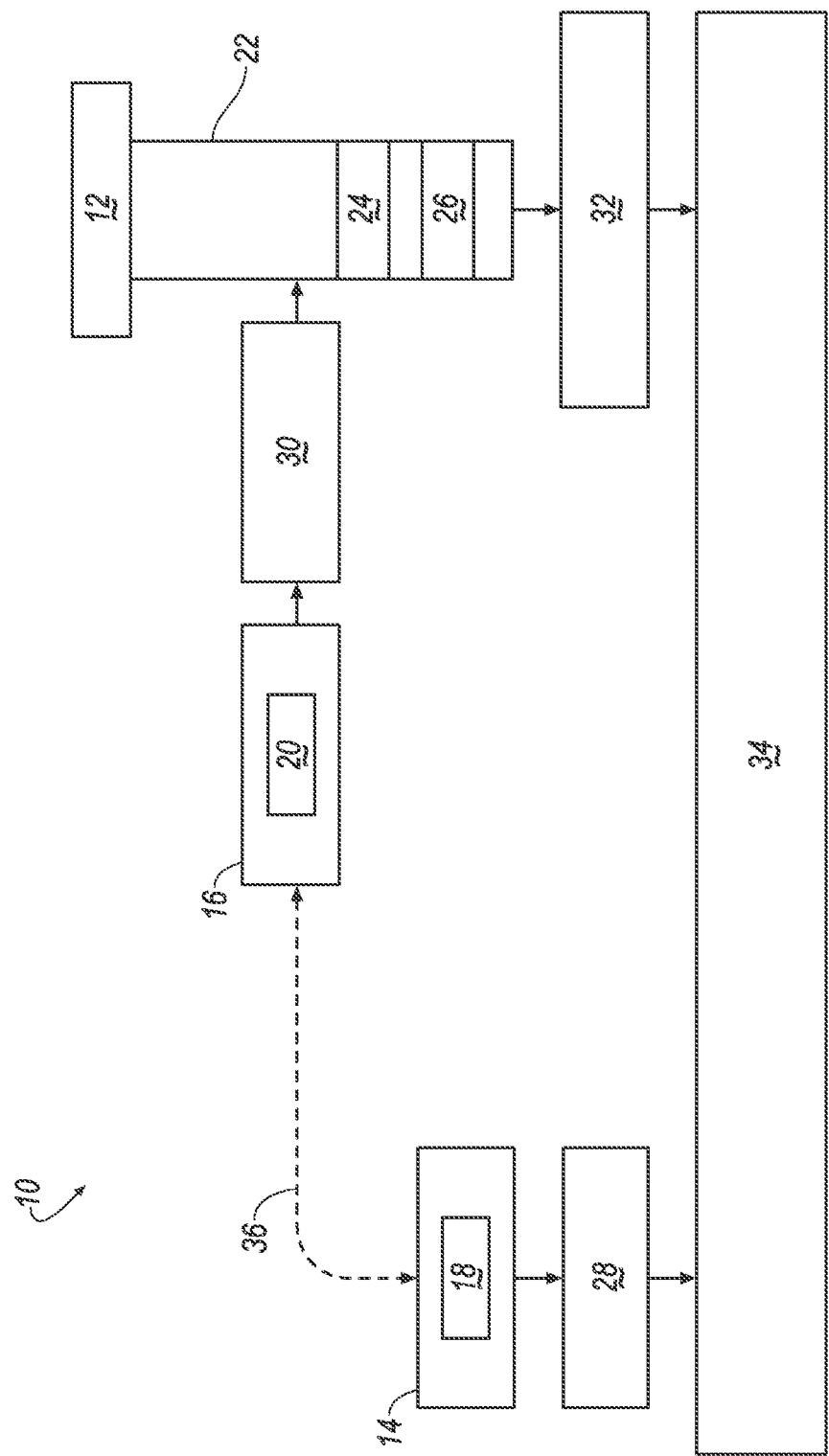
FIG. 1 is a block diagram of an example steering system for a vehicle including a steering rack and a pair of actuators.

FIG. 1 is a block diagram of a steering system 10 in a vehicle. The vehicle steering system 10 includes a steering wheel 12. The steering wheel 12 allows an operator to steer the vehicle by transmitting rotation of the steering wheel 12 to movement of a steering rack 34. The steering wheel 12 may be, e.g., a rigid ring fixedly attached to a steering column 22 such as is known.

The system 10 includes a rack actuator 14. The rack actuator 14 is an actuator that is arranged to engage the steering rack 34, providing additional power to move the steering rack 34. The rack actuator 14 includes a rack microprocessor 18 programmed to receive instructions from the vehicle computer 40 and to actuate the rack actuator 14. The rack actuator 14 actuates a rotation mechanism 28 engaged with the steering rack 34. The rack actuator 14 may be, e.g., a hydraulic actuator, an electric actuator, etc.

The system 10 includes a column actuator 16. The column actuator 16 is arranged to engage the steering column 22, providing additional power to move the steering column 22. The column actuator 16 includes a column microprocessor 20 programmed to receive instructions from the vehicle computer 40 to actuate the column actuator 16. The column actuator 16 actuates a rotation mechanism 30 engaged with the steering column 22. The column actuator 16 may be any one of a variety of known types of actuator, e.g., a hydraulic actuator, an electric actuator, etc.

The system 10 includes the steering column 22. The steering column 22 transfers rotation of the steering wheel 12 to movement of the steering rack 34. The steering column 22 may be, e.g., a shaft connecting the steering wheel 12 to the steering rack 34. The steering column 22 may house a torsion sensor 24 and a clutch 26. The column actuator 16 may actuate the rotation mechanism 30 to rotate the steering column 22, as described below.

The torsion sensor 24 may be disposed between the steering column 22 and the steering rack 34. The torsion sensor 24 may measure the rotation of the steering column 22 and the torque generated by the rotation of the steering column 22. The torsion sensor 24 may communicate with the microprocessors 18, 20 and may send data about the torque generated by the steering column 22 to the microprocessors 18, 20. The microprocessors 18, 20 may use the torque data to actuate the actuators 14, 16.

The clutch 26 may be disposed between the steering column 22 and the steering rack 34. The clutch 26 selectively transmits rotational motion of the steering column 22 to the steering rack 34. That is, the clutch 26 may be engaged, during which rotation of the steering column 22 is transmitted to the steering rack 34, or the clutch 26 may be disengaged, during which rotation of the steering column 22 is not transmitted to the steering rack 34. The microprocessors 18, 20 may engage and disengage the clutch 26.

The system 10 includes a rotation mechanism 28 between the rack actuator 14 and the steering rack 34. The rotation mechanism 28 transfers rotational motion of the rack actuator 14 to linear motion of the steering rack 34, i.e., the rotation mechanism 28 is a rotation-to-linear mechanism. That is, upon instruction from the rack microprocessor 20, the rack actuator 14 may rotate the rotation mechanism 28, causing linear movement of the steering rack 34. The rotation mechanism 28 may be a mechanism known for translating rotational to linear force. e.g., a belt and ball nut, a rack and pinion, etc., as described below and shown in FIG. 4. The rotation mechanism 28 allows the operator and/or the virtual operator to move the steering rack 34 with less force applied on the steering wheel 12, i.e., as a power steering and/or steering assist mechanism.

The system 10 includes a rotation mechanism 30 between the column actuator 16 and the steering column 22. The rotation mechanism 30 transfers rotational motion of the column actuator 16 to rotational motion of the steering column 22, i.e., the rotation mechanism 30 is a rotation-to-rotation mechanism. That is, upon instruction from the column microprocessor 20, the column actuator 16 rotates the rotation mechanism 30, causing rotation of the steering column 22. The rotation mechanism 30 may be a mechanism known for translating rotational to rotational force, e.g., a worm gear, as described below and shown in FIG. 4. The rotation mechanism 30 allows the operator and/or the virtual operator to move the steering column 22 with less force applied on the steering wheel 12. i.e., as a power steering and/or steering assist mechanism.

The system includes a rotation mechanism 32 between the clutch 26 and the steering rack 34. The rotation mechanism 32 transfers rotational motion of the clutch 26 (as driven by the steering column 22) to linear motion of the steering rack 34 when the clutch 26 is engaged. The rotation mechanism 32 may be a mechanism known for translating rotational to linear force, e.g., a belt and ball nut as described below and shown in FIG. 4.

The system 10 includes the steering rack 34. The steering rack 34 transfers rotational motion of the steering column 22 to rotation of the wheels (not shown) of the vehicle. The steering rack 34 is engaged with the rotation mechanisms 28, 32. The steering rack 34 may be, a mechanism known for translating rotational to rotational force e.g., a rigid bar or shaft having teeth engaged with the rotation mechanisms 28, 32.

Figure 2:
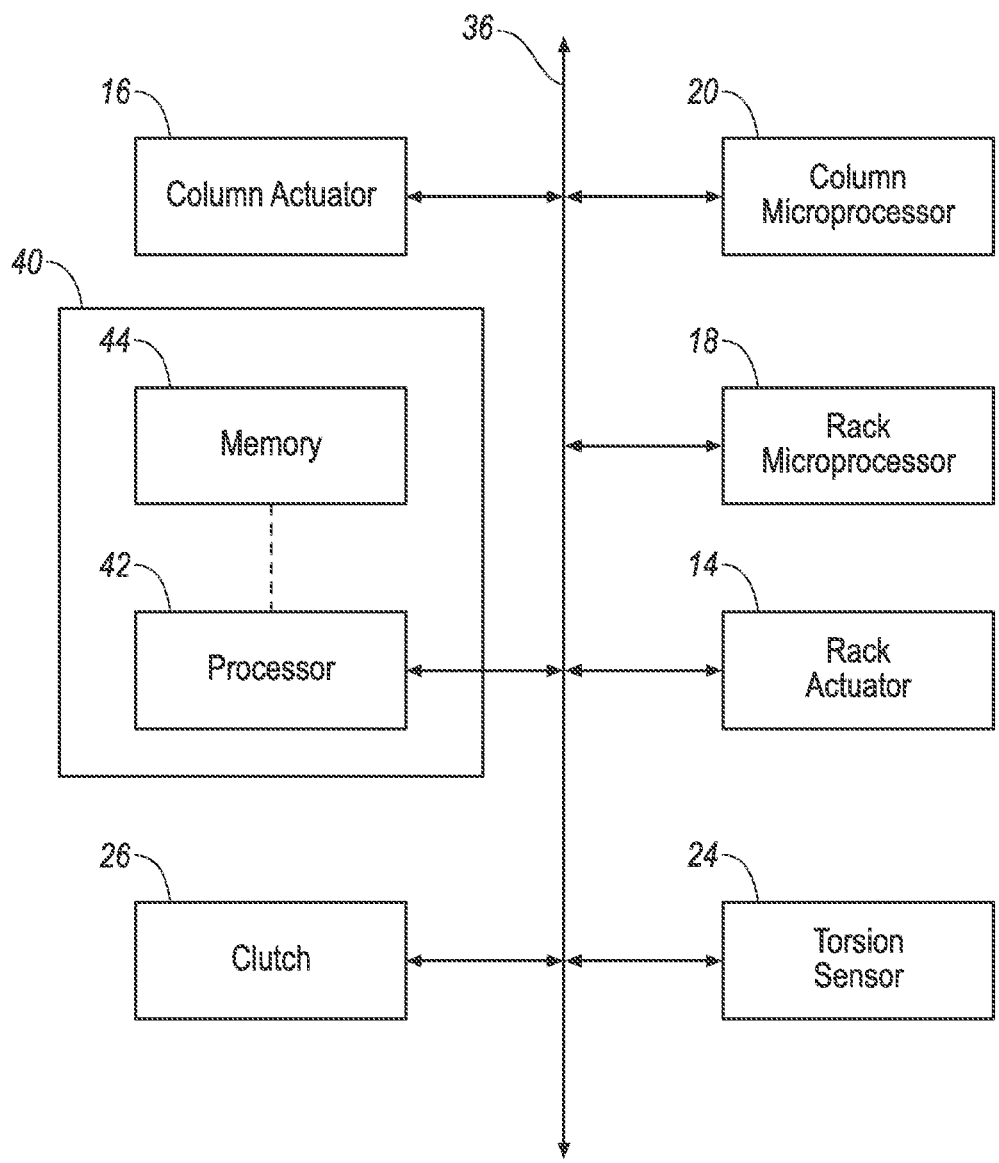
FIG. 2 is a block diagram of the actuators in communication with a vehicle computer.

The system 10 includes a communication bus 36. As described below, the communication bus 36 transmits data between the components of the system 10, including the actuators 14, 16, the torsion sensor 24, and the clutch 26, as shown in FIG. 2. The bus may be one or more mechanisms for network communications in a vehicle such as are known. e.g., a controller area network (CAN) bus, which, by way of example and not limitation, may be configured for communications as a controller area network (CAN) bus or the like, and/or may use other communications mechanisms and/or protocols, may be used to provide various communications, including data between the actuators 14, 16, the microprocessors 18, 20, etc.

FIG. 2 illustrates a block diagram of components of the system 10. The system 10 includes a vehicle computer 40. The vehicle computer 40 may be programmed to operate as a virtual operator of the vehicle. When the vehicle computer 40 operates the vehicle subsystems as a virtual operator, the vehicle computer 40 ignores input from the human operator with respect to subsystems selected for control by the virtual operator, which provides instructions, e.g., via a vehicle communications bus and/or to electronic control units (ECUs) as are known, to actuate vehicle components, e.g., to change a steering wheel 12 angle, actuate the steering rack 34, etc.

The vehicle computer 40 includes a processor 42 in communication with a memory 44. The processor 42 includes programming such as is known to actuate the components of the vehicle, e.g., the actuators 14, 16, the torsion sensor 24, the clutch 26, etc. The memory 44 stores instructions executable by the processor 42 to actuate the components of the vehicle. The memory 44 may be of any known type. e.g., hard disk drives, solid state drives, servers, or any volatile or non-volatile media.

The vehicle computer 40 is generally programmed for communications on the bus 36. Via the bus 36, the vehicle computer 40 may transmit messages to various devices in the vehicle and/or receive messages from the various devices, e.g., the actuators 14, 16, the microprocessor 18, 20, the rotation mechanisms 28, 30, etc. Alternatively or additionally, in cases where the vehicle computer 40 actually comprises multiple devices, the bus 36 may be used for communications between devices represented as the vehicle computer 40 in this disclosure.

A vehicle including the system 10 may be operated by a human operator, e.g., in a known manner. The vehicle computer 40 may be programmed to operate components of the vehicle, including. e.g., the actuators 14, 16, the microprocessors 18, 20, the clutch 26, etc., with limited or no input from the human operator. Such programming as is presently known, and including possible future developments thereto, may be referred to as a "virtual operator," and may be stored in the memory 44.

The vehicle computer 40 may be programmed to operate the components of the vehicle in one of a plurality of autonomous modes. The autonomous modes may include a manual mode, a partially autonomous mode, and a fully autonomous mode. In the manual mode, the vehicle computer 40 operates the components of the vehicle based solely on the input of the human operator, and with no input from the virtual operator. In the autonomous mode, the vehicle computer 40 operates on the input of the virtual operator, with limited or no input from the human operator. In the partially autonomous mode, the vehicle computer 40 operates at least some components based on input from the virtual operator and at least some components based on input from the human operator. For example, in the partially autonomous mode, the vehicle computer 40 may operate the actuators 14, 16 based on input from the virtual operator and an entertainment subsystem based on input from the human operator. In another example of the partially autonomous mode, the vehicle computer 40 may operate the rack actuator 14 based on input from the virtual operator and may operate the column actuator 16 based on input from the human operator, e.g., from motion of the steering wheel 12.

The actuators 14, 16 may be operated in one of a plurality of operation modes including an angle control mode, a torque control mode, and a feedback mode. In the angle control mode, the respective microprocessor 18, 20 for the actuator 14, 16 receives a predetermined steering angle. The predetermined steering angle may be determined by the vehicle computer 40 acting as the virtual operator or may be determined by the torsion sensor 24 measuring the angle that the steering column 22 has turned. Upon receiving the predetermined steering angle, the microprocessor 18, 20 instructs the actuator 14, 16 to adjust the rotation mechanism 28, 30 based on the steering angle. For example, the rack microprocessor 18 instructs the rack actuator 14 to actuate the rotation mechanism 28 to move the steering rack 34 according to the steering angle. In another example, the column microprocessor 20 instructs the column actuator 16 to actuate the rotation mechanism 30 to move the steering column 22 according to the steering angle.

The actuators 14, 16 may be operated in the torque control mode. In the torque control mode, the respective microprocessor 18, 20 for the actuator 14, 16 receive a torque from the torsion sensor 24. The microprocessor 18, 20 then instructs the actuator 14, 16 to adjust the rotation mechanism 28, 30 based on the received torque. For example, the rack microprocessor instructs the rack actuator 14 to actuate the rotation mechanism 28 to move the steering rack 34 to reduce the torque measured by the torsion sensor 24, i.e., to untwist the steering column 22. In another example, the column microprocessor 18 instructs the column actuator 16 to actuate the rotation mechanism 30 to rotate the steering column 22 to reduce the toque measured by the torsion sensor 24.

Based on the autonomous mode of the vehicle computer 40 and the operating one of the actuators 14, 16, the microprocessors 18, 20 are programmed to operate their respective actuators 14, 16 in either the angle control mode or the torque control mode. When both actuators 14, 16 are operating and the vehicle computer 40 is operating in the fully autonomous mode, the rack actuator 14 may operate in the angle control mode and the column actuator 16 may operate in the torque control mode with the clutch 26 engaged with the steering rack 34. The microprocessors 18, 20 may cause the power steering workload to be shared between the rack actuator 14 and the column actuator 16.

The microprocessors 18, 20 may be programmed to operate the actuators 14, 16 in the feedback mode. To operate in the feedback mode, both actuators 14, 16 are operating and the vehicle computer 40 is operating in the fully autonomous mode. In the feedback mode, the clutch 26 is disengaged from the steering rack 34, and the column actuator 16 may operate in either the angle control mode or the torque control mode. Here, the column actuator 16 provides tactile feedback to the human operator by rotating the steering column 22 and the steering wheel 12 according to data from the torsion sensor 24 and the rack microprocessor 18, the data reflecting the movement of the steering rack 34 and road conditions that affect steering of the vehicle. That is, the virtual operator may determine a planned path of travel of the vehicle, and the virtual operator may instruct the first actuator 14 to actuate the rotation mechanism 28 to move the steering rack 34 a predetermined distance to steer the vehicle according to the path. As the first actuator 14 moves the steering rack 34 to move the vehicle along the path, the virtual operator may instruct the second actuator 16 to actuate the rotation mechanism 30 to rotate the steering column 22 and the steering wheel 12 to an angle that would result in a movement of the steering rack 34 to a distance substantially similar to the movement of the steering rack 34 to the predetermined distance caused by the first actuator. Thus, the human operator may receive feedback indicating how the first actuator 14 is steering the vehicle.

The microprocessors 18, 20 may be programmed to detect a failure in one of the actuators 14, 16. That is, the microprocessors 18, 20 may detect when one of the rack actuator 14, the column actuator, and/or one of the rotation mechanisms 28, 30 is not operational. Furthermore, each one of the microprocessors 18, 20 may detect when the other of the microprocessors 18, 20 is not operational. The rack microprocessor 18 may determine that the column actuator 16 has failed when at least one of the column actuator 16, the column microprocessor 20, and/or the rotation mechanism 30 is not operational. The column microprocessor 20 may determine that the rack actuator 14 has failed when at least one of the rack actuator 14, the rack microprocessor 18, and/or the rotation mechanism 28 is not operational.

When the column microprocessor 20 detects a failure in at least one of the rack actuator 14, the rack microprocessor 18, and/or the rotation mechanism 28, the column microprocessor 20 may adjust the operation mode of the column actuator 16 depending on the autonomous mode of the vehicle computer 40. The column microprocessor 20 may operate the column actuator 16 in the angle control mode when the vehicle computer 40 is operating in the fully autonomous mode, i.e., as the virtual operator, and the column microprocessor 20 may operate the column actuator 16 in the torque control mode when the vehicle computer 40 is operating in the partially autonomous mode or the manual mode.

When the rack microprocessor 18 detects a failure in at least one of the column actuator 16, the column microprocessor 20, and/or the rotation mechanism 30, the rack microprocessor 18 may adjust the operation mode of the rack actuator 14 to the angle control mode. The rack microprocessor 18 may instruct the vehicle computer 40 to disengage the clutch 26 to reduce the friction and damping generated from the steering column.

When one of the microprocessors 18, 20 detects that the actuator 14, 16 are both operating in the same operation mode, the rack microprocessor 18 adjusts the operation mode of the rack actuator 14 to the torque control mode and the column microprocessor 20 adjusts the operation mode of the column actuator 16 to the angle control mode.

Figure 3:
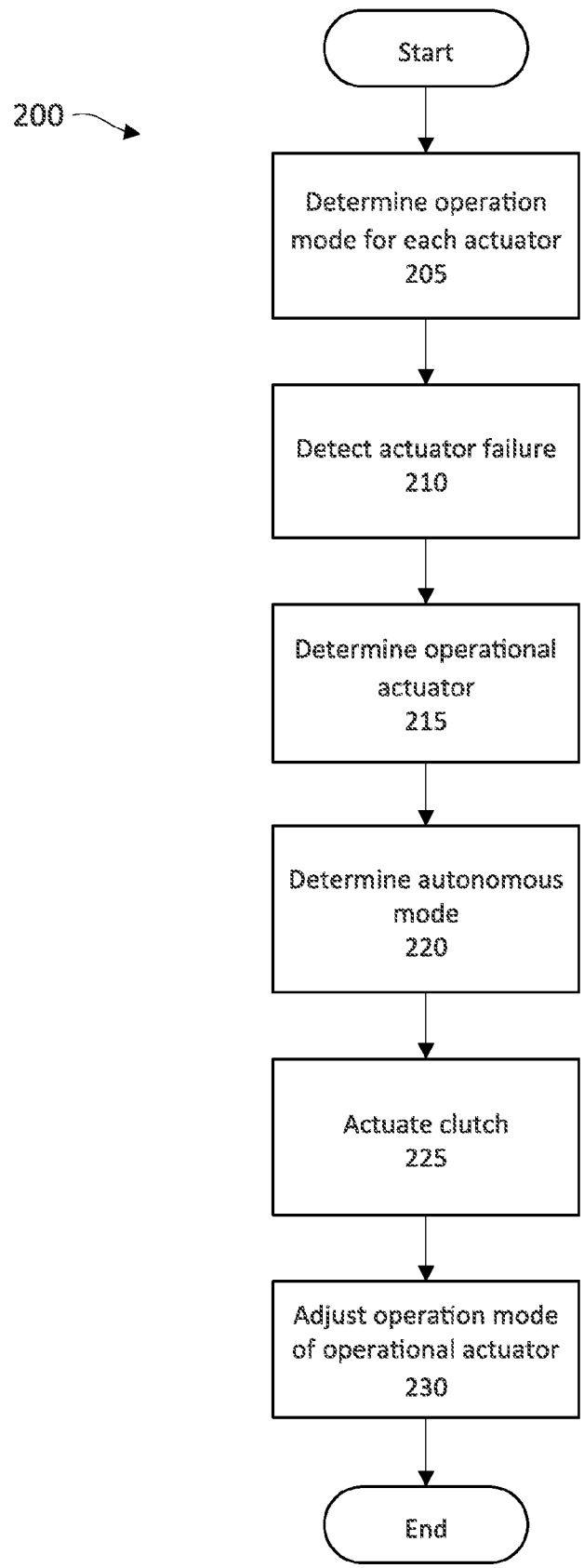
FIG. 3 is a block diagram of an example process for actuating the steering rack upon detecting a failure in one of the actuators.

FIG. 3 illustrates a process 200 for determine a failure in one of the actuators 14, 16 and adjusting the operation mode of the operational one of the actuators 14, 16. The process 200 begins in a block 205, where the microprocessors 18, 20 determine the operation modes for the actuators 14, 16. As described above, the actuators 14, 16 may operate in one of the angle control mode, the torque control mode, and the feedback mode. The microprocessors 18, 20 determine the operation modes of the actuators 14, 16 and operate the actuators 14, 16 according to the operation modes when both actuators 14, 16 are operational.

Next, in a block 210, one of the microprocessors 18, 20 detects a failure on one of the actuators 14, 16. The microprocessors 18, 20 may share data over the bus 36, and based on the data, the microprocessors 18, 20 can determine a failure in one of the actuators 14, 16. The microprocessors 18, 20 may detect a failure in one of the actuators 14, 16 directly, i.e., that one of the actuators 14, 16 is not operational, and/or may detect a failure in a component connected to the actuators 14, 16, i.e., the microprocessors 18, 20 and/or the rotation mechanisms 28, 30. For example, the microprocessors 18, 20 may determine a failure in the rack actuator 14 when any one of the rack actuator 14, the rack microprocessor 18, and/or the rack rotation mechanism 28 are not operational.

Next, in a block 215, the microprocessors 18, 20 determine the operational one of the actuators 14, 16. Upon detecting a failure in one of the actuators 14, 16, the microprocessors 18, 20 determine which one of the actuators 14, 16 has not failed, i.e., is operational. For example, if the rack actuator 14 fails, the microprocessors 18, 20 determine that the column actuator 16 is operational. The column microprocessor 20 then instructs the vehicle computer 40 that the column actuator 16 is operational.

Next, in a block 220, the microprocessors 18, 20 determine the autonomous mode for the vehicle computer 40. The microprocessor 18, 20 communicate with the vehicle computer 40 over the bus 36 to determine the autonomous mode in which the vehicle computer 40 is operating. As described above, the vehicle computer 40 can operate in the fully autonomous mode, the partially autonomous mode, and the manual mode. Based on the autonomous mode, the microprocessors 18, 20 adjust the operation mode of the actuators 14, 16, as described above.

Next, in a block 225, the microprocessors 18, 20 actuate the clutch 26. Depending on the operation mode of the functional actuator 14, 16, the microprocessor 18, 20 may engage or disengage the clutch 26. For example, if the column actuator 16 fails, the rack microprocessor 18 can disengage the clutch 26 to reduce damping on the steering rack 34 from the steering column 22. Based on the autonomous mode of the vehicle computer 40 and the current operation modes of the actuators 14, 16, the microprocessors 18, 20 may decide not to change whether the clutch 26 is engaged or disengaged. That is, the block 225 may be skipped if the clutch is already actuated according to the operation mode required by the microprocessors 18, 20, as described above.

Next, in a block 230, the microprocessors 18, 20 adjust the operation mode of the functional one of the actuators 14, 16, and the process 200 ends. As described above, the microprocessors 18, 20 adjust the operation mode of the actuators 14, 16 depending on the level of autonomy and the specific working actuator 14, 16. For example, if the column actuator 16 is functional and the rack actuator 14 has failed, the column microprocessor 20 may adjust the operation mode of the column actuator 16 to the angle control mode when the vehicle computer 40 is operating in the autonomous mode and to the torque control mode when the vehicle computer 40 is operating in the partially autonomous mode or the manual mode.

Figure 4:
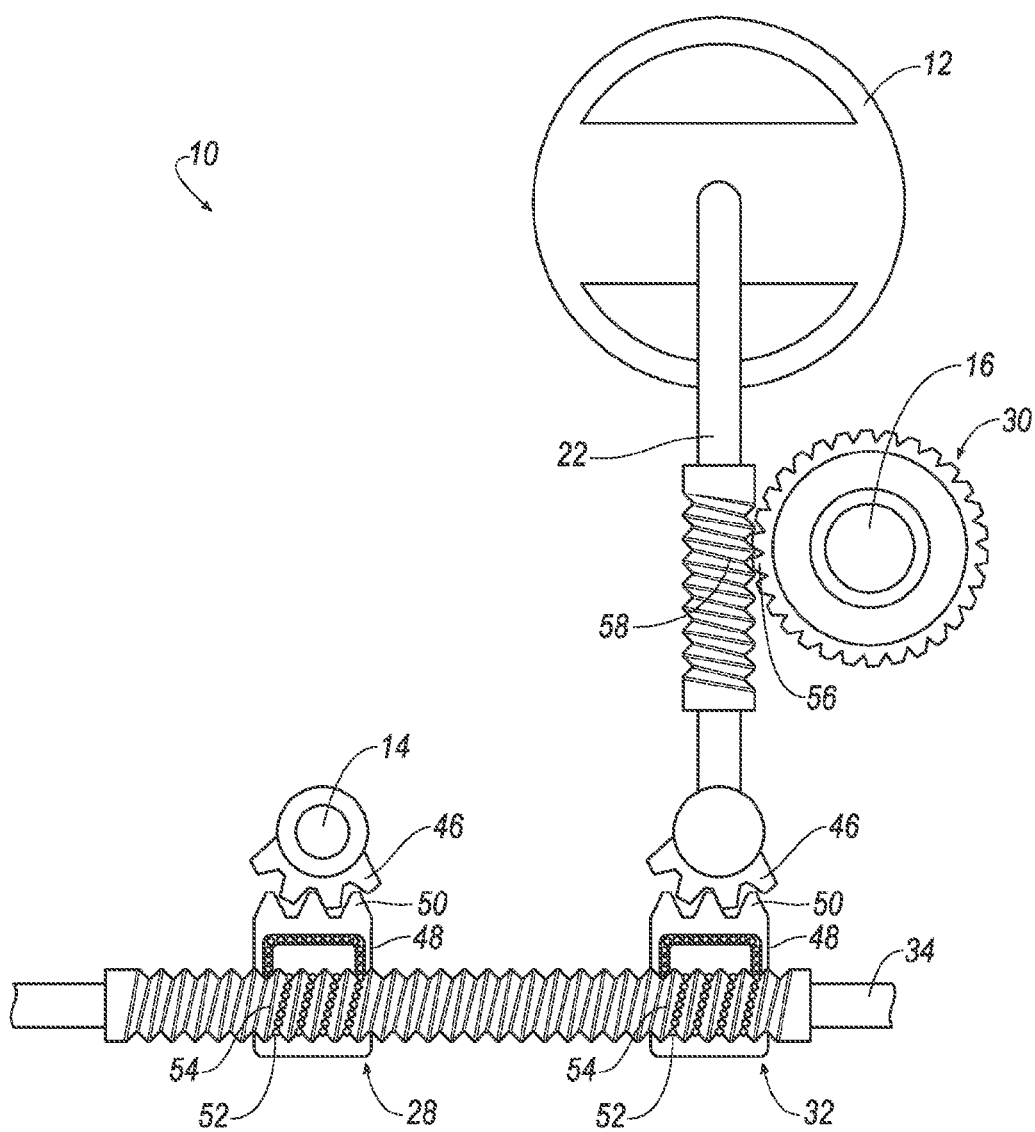
FIG. 4 is a view of the example steering system of FIG. 1.

FIG. 4 illustrates example components of the steering system 10. As described above, the steering system may include the steering wheel 12, the actuators 14, 16, the steering column 22, the rotation mechanisms 28, 30, 32, and the steering rack 34. FIG. 4 illustrates example rotation mechanisms 28, 30, 32 engaged with the steering rack 34 and the steering column 22.

The rack actuator 14 may engage the rotation mechanism 28 to move the steering rack 34. As described above, the rotation mechanism 28 may be a ball nut that engages teeth 46 of the rack actuator 14. That is, the rotation mechanism 28 may include a housing 48 having teeth 50 that engage the teeth 46 of the rack actuator 14. The teeth 50 receive rotational movement of the teeth 46 and move the rotation mechanism 28 horizontally along the steering rack 34. The rotation mechanism 28 includes a plurality of balls 52 disposed in the housing 48 engaging teeth 54 of the steering rack 34. As the rack actuator 14 rotates the teeth 46 to move the teeth 50 horizontally, the balls 52 grip the teeth 54 of the steering rack 34, transferring horizontal movement of the rotation mechanism 28 to horizontal movement of the steering rack 34. Because the balls 52 are slidably wrapped around the teeth 54, the rotation mechanism 28 allows rotation of the steering rack 34 while providing horizontal (i.e., axial) movement of the steering rack 34. Thus, based on the operation mode of the rack actuator 14, the rack actuator 14 may move the steering rack 34.

The column actuator 16 may engage the rotation mechanism 30 to move the steering column 22. As described above, the rotation mechanism 30 may be a worm gear having teeth 56 that engage teeth 58 of the steering column 22. As the rack actuator 16 rotates the rotation mechanism 30, the teeth 56 push on the teeth 58 and rotate the steering column 22. Thus, based on the operation mode of the column actuator 16, the column actuator 16 may move the steering column 22.

The steering column 22 may engage the rotation mechanism 32 to horizontally move the steering rack 34. The rotation mechanism 32 may be a ball nut, as described above for the rotation mechanism 28. The rotation mechanism 32 includes a housing 48 having teeth 50 engaging teeth 46 of the steering column 22. The rotation mechanism 32 may include balls 52 engaged with teeth 54 of the steering rack 34. Thus, when the steering column 22 rotates the teeth 46, the teeth 46 push on the teeth 50, pushing the balls 52 horizontally (i.e., in an axial direction of the steering rack 34) against the teeth 54 and moving the steering rack 34.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, or the steps could be executed in a different order than shown in FIG. 3. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the computer to:
   determine an operation mode of a first actuator engaged with a steering rack;
   determine an operation mode of a second actuator engaged with a steering column;
   adjust the operation mode of one of the first and second actuators upon detecting a failure in the other of the first and second actuators;
   actuate at least one of the steering rack and the steering column based on the operation mode; and
   provide, in an angle control mode, a predetermined steering angle to the first and second actuators and to adjust the steering rack according to the steering angle, and to provide, in a torque control mode, a steering column torque from a torsion sensor disposed on the steering column to the first and second actuators, and to adjust the steering rack according to the steering column torque.

2. The system of claim 1, wherein the instructions further include instructions to adjust the operation mode of the second actuator to the torque control mode upon detecting the failure in the first actuator.

3. The system of claim 2, wherein the instructions further include instructions to adjust the operation mode of the second actuator to the angle control mode when a virtual operator operates the steering column in a fully autonomous mode.

4. The system of claim 1, wherein the instructions further include instructions to adjust the operation mode of the first actuator to the angle control mode upon detecting the failure in the second actuator.

5. The system of claim 4, wherein the instructions further include instructions to disengage a clutch when the first actuator is in the angle control mode.

6. The system of claim 1, wherein the first actuator is attached to a rotation mechanism rotatably engaged with the steering rack and the instructions further include instructions to rotate the rotation mechanism according to the predetermined steering angle when the first actuator is in the angle control mode.

7. The system of claim 1, wherein the second actuator is attached to a rotation mechanism engaged with the steering column and the instructions further include instructions to rotate the rotation mechanism to reduce the steering column torque determined by the torsion sensor when the second actuator is in the torque control mode.

8. The system of claim 1, wherein the instructions further include instructions to adjust the operation mode of the first actuator to the torque control mode and to adjust the operation mode of the second actuator to the angle control mode when both the first and second actuators are operational.

9. The system of claim 1, wherein the instructions further include instructions to disengage a clutch when both the first and second actuators are in the angle control mode.

10. The system of claim 1, wherein the instructions further include instructions to disengage a clutch, to actuate the first actuator to move the steering rack a predetermined distance, and to actuate the second actuator to rotate the steering column to an angle based on the predetermined distance of the steering rack.

11. A method, comprising:
determining an operation mode of a first actuator engaged with a steering rack;
determining an operation mode of a second actuator engaged with a steering column;
adjusting the operation mode of one of the first and second actuators upon detecting a failure in the other of the first and second actuators;
actuating at least one of the steering rack and the steering column based on the operation mode; and
providing, in an angle control mode, a predetermined steering angle to the first and second actuators and to adjust the steering rack according to the steering angle, and providing, in a torque control mode, a steering column torque from a torsion sensor disposed on the steering column to the first and second actuators, and to adjust the steering rack according to the steering column torque.

12. The method of claim 11, further comprising adjusting the operation mode of the second actuator to the torque control mode upon detecting the failure in the first actuator.

13. The method of claim 12, further comprising adjusting the operation mode of the second actuator to the angle control mode when a virtual operator operates the steering column in a fully autonomous mode.

14. The method of claim 11, further comprising adjusting the operation mode of the first actuator to the angle control mode upon detecting the failure in the second actuator.

15. The method of claim 14, further comprising disengaging a clutch when the first actuator is in the angle control mode.

16. The method of claim 11, wherein the first actuator is attached to a rotation mechanism rotatably engaged with the steering rack and the method further comprises rotating the rotation mechanism according to the predetermined steering angle when the first actuator is in the angle control mode.

17. The method of claim 11, wherein the second actuator is attached to a rotation mechanism engaged with the steering column and the method further comprises rotating the rotation mechanism to reduce the steering column torque determined by the torsion sensor when the second actuator is in the torque control mode.

18. The method of claim 11, further comprising adjusting the operation mode of the first actuator to the torque control mode and adjusting the operation mode of the second actuator to the angle control mode when both the first and second actuators are operational.

19. The method of claim 11, further comprising disengaging a clutch when both the first and second actuators are in the angle control mode.

20. The method of claim 11, further comprising disengaging a clutch, actuating the first actuator to move the steering rack a predetermined distance, and actuating the second actuator to rotate the steering column to an angle based on the predetermined distance of the steering rack.

* * * * *